(No Model.)

C. R. REID.
SEED PLANTER.

No. 418,062. Patented Dec. 24, 1889.

Witnesses:
E. P. Ellis,
J. M. Nesbit.

Inventor:
Chas. R. Reid,
per
F. A. Lehmann,
atty.

UNITED STATES PATENT OFFICE.

CHARLIE RUFUS REID, OF MERIDIAN, MISSISSIPPI.

SEED-PLANTER.

SPECIFICATION forming part of Letters Patent No. 418,062, dated December 24, 1889.

Application filed August 20, 1889. Serial No. 321,388. (No model.)

*To all whom it may concern:*

Be it known that I, CHARLIE RUFUS REID, of Meridian, in the county of Lauderdale and State of Mississippi, have invented certain new and useful Improvements in Walking Seed-Planters; and I do hereby declare the following to be a full, clear, and exact description of the invention, such will enable others skilled in the art to which it pertains to make and use it, reference being had to the accompanying drawings, which form part of this specification.

My invention relates to an improvement in walking seed-planters; and it consists in the combination and arrangement of devices hereinafter described, and pointed out in the claims.

One object of my invention is to provide a walking-planter with a spring-yielding furrow-opener in front of the operating-wheel, so that the tooth will rise out of the ground when an obstruction is encountered, and thus allow the wheel to remain in contact with the ground and continue to operate the seeding mechanism in contradistinction to a rigid furrow-opener, which will, as it strikes an obstruction, raise the whole machine upward and lift the operating-wheel above the ground, so that the operating mechanism is thrown out of gear.

Another object of my invention is to pivot the hopper which carries the sprocket-wheels and stirrers, and to provide a sliding adjustable block whereby the sprocket-chain may be tightened to any desired degree.

Figure 1:
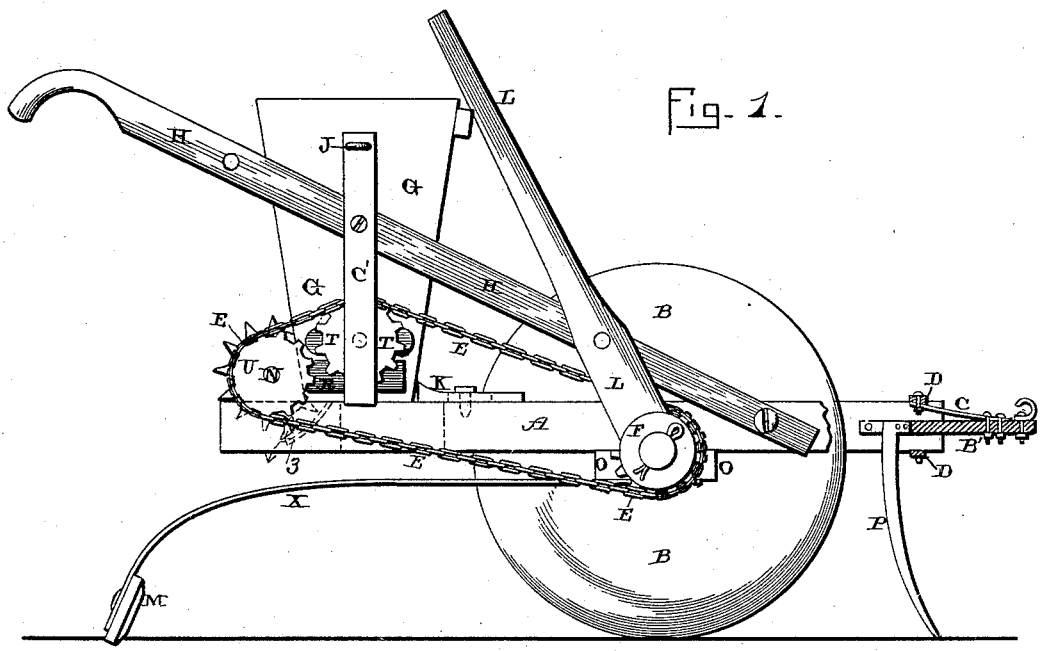
Figure 2:
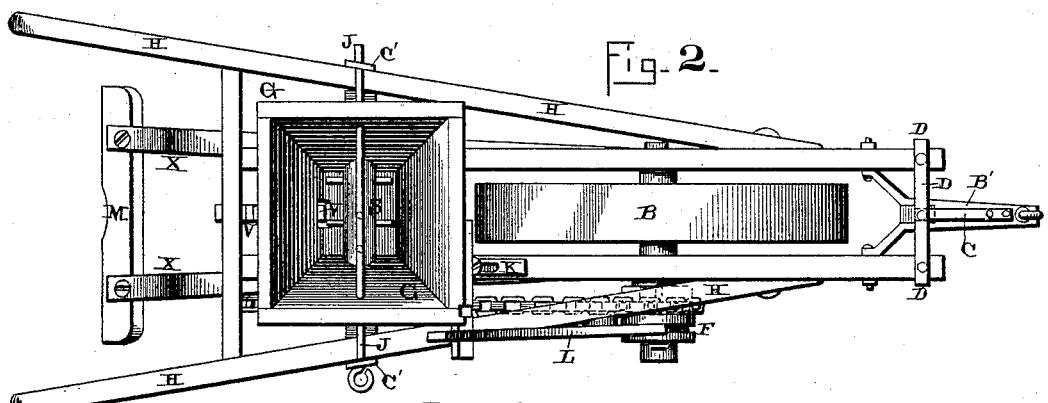
Figure 3:
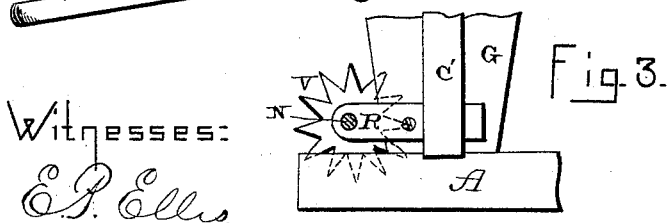

Figure 1 is a side elevation of a planter which embodies my invention, partly in section. Fig. 2 is a plan view of the same. Fig. 3 is a detail view.

A represents the frame of the machine, and B the supporting-wheel, which operates the seeding mechanism. The front end of the bars A, which form the frame, are united by the two iron bars D, which are placed above and below the beams, respectively, and to the center of the upper one is secured one end of the spring C. The front end of this spring is secured to the top of the front end of the beam B', which has its rear end bifurcated and pivoted between the front ends of the bars A.

Rigidly secured to the beams B' is the furrow-opener P. The beam B', being pivoted at its rear end, is supported in position at its front end by means of the spring C, which is rigidly secured thereto, thus allowing the beam and furrow-opener P a limited vertical play. If the furrow-opener should encounter an obstruction of any kind, the pressure against the lower end of this furrow-opener causes the front end of the beam B' to overcome the upward tension of the spring C and to sink as far as the lower cross-bar will allow, when the furrow-opener P will be turned backward at such an angle as to freely ride over the obstruction, and thus prevent the front end of the frame from being raised upward to such an extent as to raise the operating-wheel B above the ground. As soon as the wheel B is raised above the ground, it ceases to operate the dropping mechanism, and hence portions of the ground are left unseeded. If the ground is filled with obstructions, accurate dropping cannot be done unless a spring-actuated furrow-opener is used.

Upon the shaft of the wheel B is formed one-half of a clutch, and upon the wheel F, which is placed upon this shaft, is formed the other portion of the clutch, and this wheel F is moved back and forth upon the shaft by the lever L, for the purpose of throwing the wheel F in and out of gear at the will of the operator.

Passing around the wheel F and around the sprocket-wheels T U is a sprocket-chain E, by means of which the seeding mechanism is operated, when the wheel F is thrown in gear as the machine is moved forward. When the wheel F is thrown out of gear, the seeding mechanism of course ceases to operate.

Rising above the top of the rear end of the frame A are the supports C', which are secured near their upper ends to the sides of the handles H, both for the purpose of supporting the handles and for forming bearings for the pivotal rod J, which passes through the upper end of the pivoted seed-box G. Passing through near the bottom of this seed-box G is the stirrer S, and upon the outer end of the stirrer-shaft is placed the wheel T, which is operated by the chain E. Secured to the lower end of this seed-box C are the bearings R, which project a suitable distance beyond the rear edge of the box, and in which bearings is journaled the shaft N, which is provided with the wheel U upon its outer end, so as to be driven by the chain E and the wheel V, which has its rear end to pass through the slot in the box G for the purpose of forcing the seed outward through the chute 3, which is provided for that purpose. The box G is pivoted upon the rod J, so that it can be adjusted back and forth at its lower end for the purpose of tightening or loosening the chain E upon the driving-wheels.

For the purpose of holding the box in any desired position, an endwise-moving slotted stop K is secured to the top of the frame, which has its rear end to bear against the front edge of the lower end of the box G. This stop is held in position by means of a set-screw in whatever position it may be adjusted. Should the chain be too long when it is applied to the machine, it is only necessary to adjust the box G, so as to bring the wheels T U into the desired position.

Secured to the under sides of boxes O, in which the shaft of the wheel B is journaled, are the springs X, which extend backward any suitable distance and have the coverer M secured to their rear ends.

The seeds are dropped by the wheel V from the box G into the furrow formed by the opener P and wheel B, and the covering device M covers the seed in the usual manner.

Should it be desired to plant cotton-seed, the wheel V is provided with sharp points, which extend through the opening in the bottom of the box and pull the seed out as the wheel revolves. In case corn is to be planted, the wheel may have holes formed in its edges, and these holes fill with corn as the wheel revolves and drop the corn into the furrow. If a fertilizer is to be dropped, the wheel may have blades of suitable shape secured to its edges, so as to force the fertilizer out of the box. When the machine is to be used as a fertilizer-distributer, the plow and the covering devices are taken off, and then the machine can be used by hand and pushed ahead of the operator like a wheelbarrow. Different-sized wheels U can be used on the shaft N, according to the speed it is necessary for it to have.

Having thus described my invention, I claim—

1. The combination, with the frame of a seed-planter and the supporting and operating wheel journaled therein, of the spring-actuated draft-bar B' and furrow-opener P, secured thereto in front of the wheel B, substantially as shown.

2. The combination, with the frame A and the supporting and operating wheel B, journaled therein, of the beam B', pivoted upon the frame A, the furrow-opener P, secured to the beam, the spring C, and the two cross-bars D, substantially as described.

3. The combination of the frame, the handles, the supporting-wheel journaled therein, the sprocket-wheels T U, the hopper, the support C', the pivotal rod J, the stirring devices, and the lever L, loosely connected to the handles, its lower end engaging the wheel F and its upper end engaging the hopper for holding it in the desired position, substantially as shown and described.

4. The combination of the frame, the supporting-wheel journaled therein carrying a sprocket-wheel, the handles, the hopper pivotally supported above the frame, the sprocket-wheels T U, journaled therein, the sprocket-chain, and the slide K, adjustably secured to the frame and made to engage the lower end of the hopper, whereby the chain is tightened or loosened, substantially as specified.

In testimony whereof I affix my signature in presence of two witnesses.

CHARLIE RUFUS REID.

Witnesses:
R. W. STUBBLEFIELD,
W. W. HENRY.